United States Patent
Nguyen et al.

(10) Patent No.: US 8,353,054 B2
(45) Date of Patent: Jan. 8, 2013

(54) METHOD FOR PROTECTION OF A CHIP CARD FROM UNAUTHORIZED USE, CHIP CARD AND CHIP CARD TERMINAL

(75) Inventors: Kim Nguyen, Berlin (DE); Frank Byszio, Wandlitz (DE)

(73) Assignee: Bundesdruckerei GmbH, Berlin (DE)

( * ) Notice: Subject to any disclaimer, the term of this patent is extended or adjusted under 35 U.S.C. 154(b) by 377 days.

(21) Appl. No.: 12/681,429

(22) PCT Filed: Oct. 20, 2008

(86) PCT No.: PCT/EP2008/064116
§ 371 (c)(1),
(2), (4) Date: May 14, 2010

(87) PCT Pub. No.: WO2009/056463
PCT Pub. Date: May 7, 2009

(65) Prior Publication Data
US 2010/0223479 A1  Sep. 2, 2010

(30) Foreign Application Priority Data
Oct. 29, 2007 (DE) .......................... 10 2007 000 589

(51) Int. Cl.
*H04L 29/06* (2006.01)
*G06F 7/04* (2006.01)
*G06F 17/30* (2006.01)
*G06F 21/00* (2006.01)
*G06F 11/30* (2006.01)
*G06F 12/14* (2006.01)
*H04N 7/00* (2006.01)

(52) U.S. Cl. .............. 726/30; 726/9; 713/185; 713/190; 380/278

(58) Field of Classification Search ........................ None
See application file for complete search history.

(56) References Cited

U.S. PATENT DOCUMENTS
5,241,599 A  8/1993  Bellovin et al.
(Continued)

FOREIGN PATENT DOCUMENTS
DE  3523237 A1  1/1987
(Continued)

OTHER PUBLICATIONS

Bruce Schneier, "Applied Cryptography" John Wiley & Sons, pp. 28-29 (1996).

(Continued)

*Primary Examiner* — Shin-Hon Chen
(74) *Attorney, Agent, or Firm* — Matthew B. Dernier, Esq.; Gibson & Dernier LLP

(57) ABSTRACT

A method for protection of a chip card from unauthorized use includes: inputting a first identification into a chip card terminal, producing a cipher of at least one first communication parameter using a first symmetric key derived from the first identification, a protected first communication channel being definable between the chip card terminal and the chip card, using the communication parameter, transmitting the cipher via a predefined communication channel from the chip card terminal to the chip card, attempting to decrypt the cipher using a second symmetric key by means of the chip card, the result of decryption only being the first communication parameter if the first symmetric key is identical to the second symmetric key so that the protected first communication channel can only be defined between the chip card terminal and the chip card if the first identification is correct.

13 Claims, 4 Drawing Sheets

U.S. PATENT DOCUMENTS

| | | | |
|---|---|---|---|
| 6,792,533 B2 | 9/2004 | Jablon | |
| 7,139,917 B2 | 11/2006 | Jablon | |
| 7,831,051 B2 * | 11/2010 | Zunke | 380/278 |
| 2005/0172137 A1 * | 8/2005 | Hopkins | 713/185 |
| 2007/0028118 A1 * | 2/2007 | Brown et al. | 713/185 |
| 2010/0186076 A1 * | 7/2010 | Ali et al. | 726/9 |
| 2010/0287384 A1 * | 11/2010 | Hubert | 713/190 |

FOREIGN PATENT DOCUMENTS

| | | |
|---|---|---|
| DE | 19507043 A1 | 9/1996 |
| DE | 19507044 C2 | 9/1996 |
| DE | 19850307 C2 | 5/2000 |
| DE | 10338643 A1 | 3/2005 |
| EP | 0730253 B1 | 9/1996 |

OTHER PUBLICATIONS

International Search Report for corresponding PCT application No. PCT/EP08/064116, dated Jul. 27, 2009.
David P. Jablon; Strong Password-Only Authenticated Key Exchange; www.integritySciences.com (Mar. 2, 1997) www.jablon.org/speke97.html.
www.heise.de/security/news/meldung/85024, (Feb. 8, 2007).
National Institute of Standards and Technology (NIST) standard, NIST Special Publication 800-56A, pp. 1-114, Mar. 2007.
Standards for Efficient Cryptography, SEC1: Elliptic Curve Cryptography, Certicom Research, pp. 1-90, Sep. 20, 2000, Version 1.0.
International Preliminary Report on Patentability and Written Opinion for corresponding PCT application No: PCT/EP08/064116, dated Jun. 22, 2010.

* cited by examiner

METHOD FOR PROTECTION OF A CHIP CARD FROM UNAUTHORIZED USE, CHIP CARD AND CHIP CARD TERMINAL

CROSS REFERENCE TO RELATED APPLICATIONS

This application claims priority to International Patent Application No.: PCT/EP2008/064116, filed Oct. 20, 2008, the entire disclosure of which is hereby incorporated by reference.

BACKGROUND

The invention relates to a method for protecting a chip card from unauthorized use, to a chip card and to a chip card terminal.

To enable a chip card function, prior user identification to the chip card may be necessary, as is known per se from the prior art. The most frequent user identification is the input of a secret identifier, which is generally referred to as a PIN (Personal Identification Number) or as CHV (Card Holder Verification). Such identifiers generally comprise a numeric or alphanumeric character string. For the purpose of user identification, the identifier is input by the user on the keypad of a chip card terminal or a computer to which a chip card reader is connected, and is then sent to the chip card. The latter compares the input identifier with the stored identifier and notifies the terminal or the computer of the result by outputting an appropriate signal.

For the PINs, a distinction can be drawn between static PINs and changeable PINs. A static PIN cannot be altered by the user and needs to be memorized by him. If it has been revealed, the card user needs to destroy his chip card in order to prevent misuse by unauthorized parties, and needs to obtain a new chip card with a different static PIN. Similarly, the user requires a new chip card if he or she has forgotten the static PIN.

A changeable PIN can be changed by the user as desired. To change the PIN, for security reasons it is always necessary to provide the currently valid PIN at the same time, since otherwise any current PIN could be replaced by a hacker's own PIN.

The situation is different with what are known as Super PINs or PUKs (Personal Unlocking Key). These usually have more places than the actual PIN and are used to reset a PIN's incorrect input counter (also called "incorrect operation counter") that is at its maximum value. With the PUK, a new PIN is also transferred to the chip card at the same time because a reset incorrect operation counter is of little use if the PIN has been forgotten. Moreover, this is usually the case, of course, when the incorrect operation counter has reached its maximum value.

There are also applications which use transport PINs. The chip card is personalized using a random PIN which the card user received in a PIN letter. When it is first input, however, the chip card asks the card user to replace the personalized PIN with his own. In a similar method, called the "zero PIN method", the chip card is preassigned a trivial PIN, such as "0000", and the chip card likewise forces a change when it is first used (in this regard, cf. also DE 35 23 237 A1, DE 195 07 043 A1, DE 195 07 044 C2, DE 198 50 307 C2, EP 0 730 253 B1). Such methods provide what is known as a first user function, which provides the authorized user with the certainty that no unauthorized use of the chip card by a third party has taken place before he uses it for the first time.

DE 198 50 307 C2 discloses a method for protecting against misuse in chip cards. The chip card has a first user function which, when the data and/or functions of the chip card are used for the first time, demands that a personal secret number (PIN) which can be selected arbitrarily by the user be prescribed, wherein the input of the personal secret number sets data and/or functions of the chip card to a used status. A later change to the personal secret number is made possible by means of a superordinate unlock code.

The prior art has already disclosed methods for checking an identifier in which it is not necessary to transmit the identifier itself, such as Strong Password Only Authentication Key Exchange (SPEKE), Diffie-Hellman Encrypted Key Exchange (DH-EKE), Bellovin-Merritt protocol or Password Authenticated Connection Establishment (PACE). The SPEKE protocol is known from www.jablon.org/speke97.html, U.S. Pat. No. 6,792,533 B2 and U.S. Pat. No. 7,139,917 B2, for example. The DH-EKE protocol is likewise known from www.jablon.org/speke97.html, inter alia. The Bellovin-Merritt protocol is known from U.S. Pat. No. 5,241, 599, inter alia. The PACE protocol, which is particularly suitable for elliptic curve cryptography, is known from www.heise.de/security/news/meldung/85024.

SUMMARY OF THE INVENTION

By contrast, the invention is based on the object of providing an improved method for protecting a chip card from unauthorized use. The invention is also based on the object of providing an improved chip card and an improved chip card terminal.

The invention provides a method for protecting a chip card from unauthorized use. The method involves not only the chip card itself but also a chip card terminal.

In this context, "chip card terminal" is understood to mean any appliance which is designed for communication with a chip card in order to send chip card commands to the chip card, for example, and to receive corresponding responses from the chip card. The communication between the chip card and the chip card terminal can take place in contact-based fashion, wirelessly, for example using an RFID method, or either in contact-based fashion or wirelessly, particularly using what is known as a dual-mode interface. The chip card terminal may be what is known as a class 1, 2 or 3 chip card reader with or without its own keypad or a computer to which a chip card reader is connected. The chip card terminal may also be a terminal provided for a particular purpose, such as a bank terminal for handling bank transactions, a payment terminal, for example for purchasing electronic tickets, or an access terminal for enabling access to a protected area.

In this context, the term "protection of a chip card" is understood to mean the protection of the chip card as a whole or the protection of one or more chip card functions of the chip card. By way of example, the invention involves the protection of a chip card function which is particularly worthy of protection on the chip card, such as a signature function for generating an electronic signature, a payment function, an authentication function or the like.

In accordance with one embodiment of the method according to the invention, the authorized user receives a secret identifier, which is generally referred to as a PIN, from the office issuing the chip card. To use the chip card, it is first of all necessary to input an identifier into the chip card terminal, said identifier subsequently being referred to as the PIN'. Only if the PIN' is identical to the PIN will use of the chip card or of the protected chip card function be possible.

To this end, the chip card terminal produces a cipher from at least one first communication parameter using a first symmetric key. The first symmetric key may be the PIN' itself or may be a symmetric key derived from the PIN'. By way of example, the PIN' is used as what is known as a seed value for the generation of the first symmetric key by the chip card terminal.

The at least one communication parameter is of a nature such that it can define a protected first communication channel between the chip card terminal and the chip card. To be able to set up said protected first communication channel between the chip card and the chip card terminal, the cipher of the first communication parameter, which cipher is obtained using the first symmetric key, is first of all transmitted via a predefined communication channel from the chip card terminal to the chip card. Said predefined communication channel is thus defined as standard for setting up an initial communication between the chip card terminal and the chip card.

Following the transmission of the cipher via said predefined communication channel from the chip card terminal to the chip card, the chip card attempts to decrypt said cipher using a second symmetric key. This decryption is successful only if the second symmetric key is the same as the first key, i.e. if the prerequisite PIN'=PIN is met.

A communication link can thus be set up via the protected first communication channel only if the condition PIN'=PIN is met, since only in this case is the chip card provided with knowledge of the first communication parameter which allows the protected first communication channel to be stipulated.

By way of example, the first communication parameter may be the specification of a transmission frequency, of a frequency hopping scheme, of a coding method and/or of a modulation method.

If the condition PIN'=PIN is not met, on the other hand, the first key derived from the PIN' does not match the second key of the chip card. The result of this is that the decryption of the cipher received from the chip card terminal by the chip card using the second key does not yield the first communication parameter, but rather a second communication parameter, for example, which is different than the first communication parameter.

The second communication parameter may have defined a second communication channel which is different than the first communication channel. If the chip card receives a signal on the first communication channel, said signal is ignored, however, since the chip card expects a signal on the second communication channel. As a result, there is thus no communication between the chip card terminal and the chip card if the condition PIN'=PIN is not met.

According to one embodiment of the invention, the communication parameter may be a public key from an asymmetric key pair of the chip card terminal. To stipulate a symmetric key for the communication between the chip card terminal and the chip card, for example using the Diffie-Hellman method, the public key of the chip card terminal is encrypted using the first symmetric key obtained from the first identifier and is sent to the chip card via the predefined communication channel.

Only if the condition PIN'=PIN is met does the chip card obtain the correct public key for the chip card terminal. The chip card terminal takes the public key of the chip card, which is requested from a key server, for example, and uses the Diffie-Hellman method to generate the third key, whereas the chip card generates a fourth key, likewise using the Diffie-Hellman method, from its private key and the cipher decrypted using the second symmetric key, wherein the fourth key is the same as the third key only if the condition PIN'=PIN is met.

The third and the identical fourth symmetric key are used for encrypting signals, particularly chip card commands and responses to such chip card commands, which are interchanged between the chip card terminal and the chip card via the first communication channel. Said first communication channel is at least additionally defined by means of the third key, which is used to encrypt the communication via the first communication channel using a symmetric encryption method.

In accordance with one embodiment of the invention, a method of discrete logarithmic cryptography (DLC) is used for the generation of a third key by the chip card terminal and of a fourth key by the chip card, the fourth key being the same as the third key only if the condition PIN'=PIN is met.

The third key is stipulated using any method of discrete logarithmic cryptography, in principle, as are described by way of example in the National Institute of Standards and Technology (NIST) standard, NIST Special Publication 800-56A, March 2007, and in Standards for Efficient Cryptography, SEC1: Elliptic Curve Cryptography, Certicom Research, Sep. 20, 2000, Version 1.0. Such methods require the production of what are known as domain parameters for the purpose of the generation of the identical third and fourth keys by the chip card terminal or the chip card.

In accordance with one embodiment of the invention, the DLC used is a method for elliptic curve cryptography (ECC), particularly Elliptic Curve Diffie-Hellman (ECDH).

In accordance with one embodiment of the invention, the first identifier, i.e. the PIN', which is input into the chip card terminal is used as what is known as a seed value for the derivation of the first symmetric key. This produces a key of greater length than would be the case if the first identifier were used directly as a key.

In accordance with one embodiment of the invention, the chip card stores a second identifier, i.e. the PIN, from which it is possible to derive the second key for the decryption of the cipher initially received from the chip card terminal. The second key can be derived from the second identifier using the second identifier as a seed value.

In accordance with one embodiment of the invention, it is not the PIN itself which is stored in the chip card but rather only the second key. The second key is preferably stored in a nonvolatile protected memory area of the chip card. In contrast to the prior art, it is thus not necessary to store the PIN as a reference value in the chip card.

In accordance with one embodiment of the invention, the chip card has an incorrect operation counter. If incorrect input of the PIN' means that the first and second communication channels do not match, the chip card increments or decrements the incorrect operation counter with every message which the chip card receives on a communication channel other than the second or the predefined communication channel. Such messages which the chip card receives on a communication channel other than the second or the predefined communication channel are otherwise ignored by the chip card. If the number of incorrect operations exceeds a prescribed threshold value, the chip card as a whole or a particular chip card function is reversibly or irreversibly locked.

In accordance with one embodiment of the invention, the chip card has a first-user function. The unused chip card is in its first-use state, in which a particular communication parameter is stipulated for a first selection of the first communication channel. The chip card changes from its first-use state to a used state when it receives a chip card command on said first communication channel for the first time. For further use of the chip card, the chip card terminal then needs to select another communication parameter.

In a further aspect, the invention relates to a chip card with a chip card having an interface for communication with a chip card terminal via a predefined communication channel and a plurality of further communication channels, means for the decryption of a cipher received on the predefined channel, which cipher has been encrypted using a first symmetric key, using a second symmetric key, wherein the decryption yields at least one communication parameter if a first identifier which has been input into the chip card terminal previously is correct, wherein the communication parameter explicitly stipulates one of the further communication channels for the protected communication between the chip card and the chip card terminal.

In a further aspect, the invention relates to a chip card terminal having means for the input of a first identifier, means for the production of a cipher from at least one first communication parameter using a first symmetric key derived from the first identifier, wherein the communication parameter can be used to define a protected first communication channel between the chip card terminal and the chip card, and means for sending the cipher to the chip card via a predefined communication channel.

BRIEF DESCRIPTION OF THE DRAWINGS

Embodiments of the invention are explained in more detail below with reference to the drawings, in which.

DETAILED DESCRIPTION OF THE INVENTION

In the figures below, elements which correspond to one another in the various embodiments are denoted by the same reference symbols.

Figure 1:
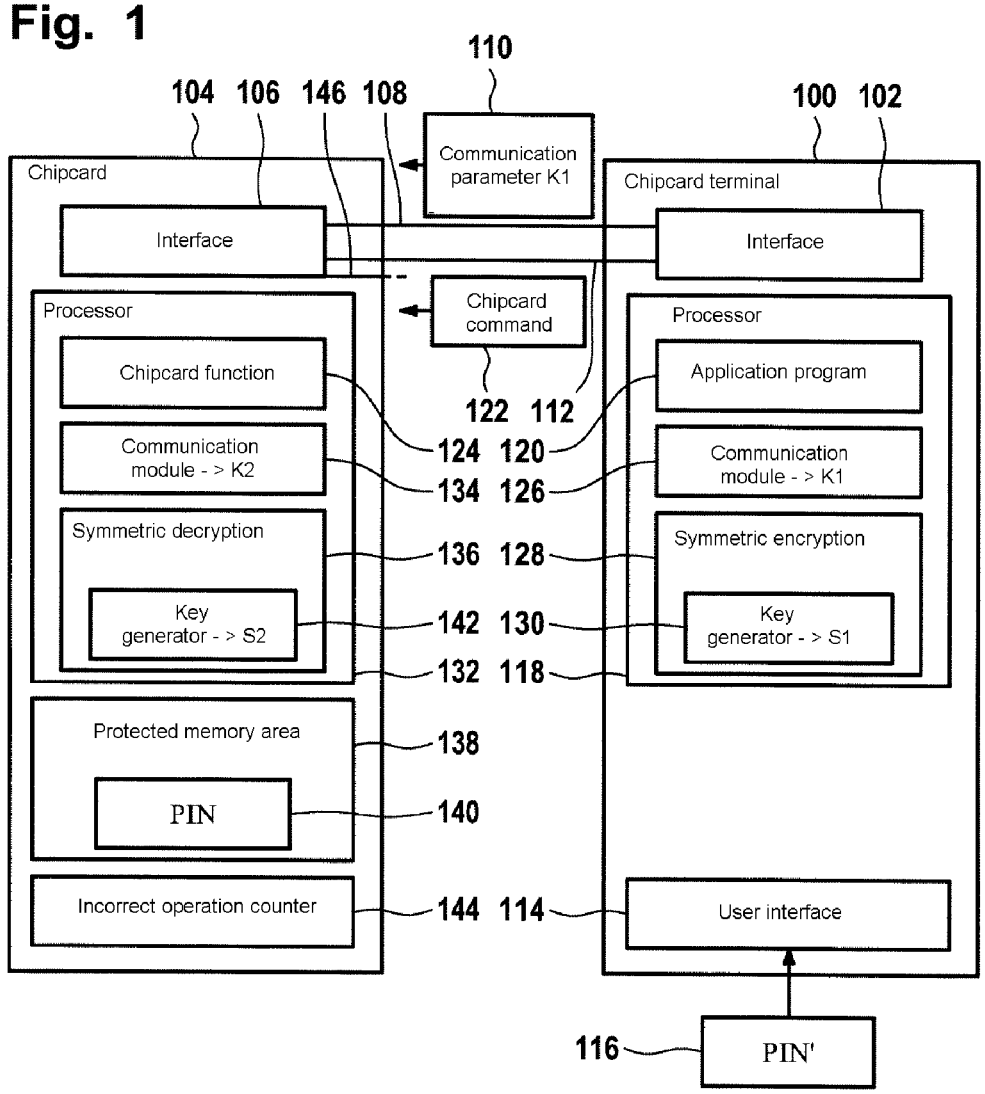
FIG. 1 shows a block diagram of a first embodiment of a chip card based on the invention and of a chip card terminal.

FIG. 1 shows a block diagram of a chip card terminal 100. The chip card terminal 100 has an interface 102 for communicating with a chip card 104 which has a corresponding interface 106. Preferably, the interfaces 102 and 106 are designed for wireless communication, for example by radio, particularly on the basis of an RFID method.

By way of example, the interfaces 102 and 106 are of a nature such that various communication channels can be set up between the interfaces 102, 106, said communication channels differing from one another on a physical and/or logical level. By way of example, communication channels at different transmission frequencies can be set up. It is also possible to set up communication channels on the basis of various frequency hopping schemes. In this context, "frequency hopping" is understood to mean frequency hopping methods which involve the frequencies used for the data transmission being continually changed on the basis of a defined scheme.

The interfaces 102, 106 may also be in a form such that different communication channels are set up using different coding methods and/or modulation methods, such as frequency modulation, amplitude modulation, phase modulation, pulse width modulation or other modulation methods.

The various communication channels which can be set up between the interfaces 102 and 106 are subsequently referred to as the "set of communication channels".

One of the communication channels 108 from the set of communication channels is predefined for the initial communication between the chip card terminal 100 and the chip card 104. By way of example, the communication channel is predefined in terms of its transmission frequency and the modulation and coding methods to be used.

The predefined communication channel is used for the transmission of a cipher 110 for the at least one communication parameter K1 from the chip card terminal 100 to the chip card 104 in order to notify the chip card 104 of which of the communication channels 112 in the set of communication channels is intended to be used for the subsequent communication with the chip card terminal 100.

The communication parameter K1 thus contains a specification which explicitly specifies said communication channel 112. This specification may be provided in the form of a codeword. The chip card 104 may store what is known as a lookup table in a nonvolatile memory, said lookup table containing a respective specification for one of the communication channels in the set of communication channels in association with the possible codewords.

For the selection of a communication channel from the set of communication channels, all possible communication channels which can be set up between the interfaces 102, 106 may be available or a selection thereof, in which case each of the communication channels in the set of communication channels that is actually able to be used for the communication between the interfaces 102, 106 is associated with an explicit codeword which can be transmitted as a communication parameter 110 from the chip card terminal 100 to the chip card 104.

The chip card terminal 100 has a user interface 114, such as a keypad or a graphical user interface, which can be used to input a first identifier 116. Said first identifier is subsequently referred to as PIN' without restricting the general nature.

The chip card terminal 100 has at least one processor 118 for executing an application program 120. The application program 120 can prompt the generation of a chip card command 122 in order to call a particular chip card function 124 of the chip card 104. In one example, the application program 120 needs the chip card function 124 for an authorization check, for the generation of a digital signature, for checking an authorization, particularly an access authorization, performing a financial transaction or the like.

In addition, the processor 118 is further used to execute the program instructions of a communication module 126 which is used for selecting the communication channel 112 from the set of communication channels and hence for selecting the communication parameter 110. The communication parameter 110 can be selected on the basis of a prescribed scheme or randomly, particularly pseudo-randomly. By way of example, the communication module 126 stores a list of different communication parameters 110 which is processed cyclically.

The processor 118 is also used to execute program instructions 128 for symmetric encryption of the communication parameters 110. The encryption is performed using the PIN'. To this end, the program instructions 128 may contain a key generator 130.

The key generator 130 may be in a form such that it takes the PIN' as a seed value and generates a first symmetric key, which is subsequently referred to as S1. The key S1 is used for the symmetric encryption of the communication parameter K1 selected by the communication module 126. The cipher obtained for the communication parameter K1 from the symmetric encryption with the key S1 is transmitted from the interface 102 to the interface 106 via the predefined communication channel 108.

The chip card 104 has a processor 132 which is used to execute the program instructions of a communication module 134. The communication module 134 is designed to process the communication parameter K1 possibly received from the chip card terminal 100. By way of example, the communication module 134 can use the communication parameter K1 as a key to access an association table, particularly a lookup table, in order to request the parameters for the communication channel 112 selected by the chip card terminal 100, such as the transmission frequency of said communication channel and/or the coding and modulation methods to be used.

The processor 132 is also used to execute program instructions 136 for the symmetric decryption of the cipher 110 which the chip card 104 has received from the chip card terminal 100. By way of example, the chip card 104 has a protected memory area 138 which stores a second identifier 140. The second identifier is subsequently referred to as the PIN without restricting the general nature. The PIN is communicated to the authorized user of the chip card separately when the chip card 104 is issued, for example in the form of what is known as the PIN letter.

The program instructions 136 may contain a key generator 142 which uses the PIN as what is known as a seed value in order to derive a second key therefrom. This symmetric second key is subsequently referred to as S2.

Alternatively, the key S2 may be stored in the protected memory area 138 of the chip card 104 instead of the PIN 140. The key generator 142 and storage of the PIN 140 in the chip card 104 are then superfluous. In contrast to the prior art, the chip card 104 therefore does not necessarily need to store the PIN 140 as a reference value for checking the correctness of the PIN' 116.

The chip card 104 may also have an incorrect operation counter 144. The incorrect operation counter 144 is designed such that every incorrect operation of the chip card 104 is counted. The number of incorrect operations is compared with a prescribed threshold value. If this threshold value is reached, at least the chip card function 124 with which the incorrect operation counter 144 is associated is reversibly or irreversibly locked.

The chip card 104 may also have a first-use function. By way of example, the first-use status of the chip card 104 is defined by a particular communication parameter which specifies one of the communication channels in the set which needs to be used for the first use of the chip card.

To use the chip card 104, the procedure is as follows: a user inputs the PIN' 116 into the chip card terminal 100 via the user interface 114. This can be done upon an appropriate request via the application program 120. The communication module 126 then selects a first of the possible communication parameters from the prescribed list of communication parameters, for example, that is to say the communication parameter K1.

The key generator 130 takes the PIN' and generates the key S1. The communication parameter K1 is then encrypted using the symmetric key S1 by executing the program instructions 128. The resultant cipher 110 for the communication parameter K1 is then sent from the interface 102 to the interface 106 of the chip card 104 via the predefined communication channel 108.

If required, the chip card 104 derives the key S2 from the PIN or accesses the key S2 directly in the protected memory area 138. The key S2 is used to make the attempt at decrypting the cipher 110 received for the communication parameter K1 from the chip card terminal 100 by virtue of the execution of the program instructions 136 by the chip card 104.

The result of this decryption attempt is a second communication parameter, which is subsequently referred to as K2 and which is transferred to the communication module 134. Said communication parameter K2 is identical to the communication parameter K1 only if the condition PIN'=PIN is met, since only then can the key S1 which has been used for the symmetric encryption be the same as the key S2, which has been used for the symmetric decryption of the cipher for the communication parameter K1.

The communication parameter K2 may define a second communication channel 146, namely by virtue of the communication module 134 using the communication parameter K2 to access its association table. Said second communication channel 146 is in turn identical to the first communication channel 112 only if the condition PIN'=PIN is met.

Following the transmission of the cipher for the communication parameter K1 via the predefined communication channel 108, the chip card terminal 100 generates the chip card command 122, which is sent via the first communication channel 112 from the interface 102 to the interface 106. The chip card 104 and the communication module 134 thereof are set to the second communication channel 146 for reception on the basis of the communication parameter K2.

If the second communication channel 146 matches the first communication channel 112, the chip card command 122 is processed by the chip card 104 and the chip card function 124 is called. As a result, the chip card 104 generates a response to the chip card command 122 and transmits said response back to the chip card 100 via the first communication channel 112.

If, by contrast, the second communication channel 146 is not identical to the first communication channel 112, the chip card 104 ignores the chip card command received on the first communication channel 112 and increments the incorrect operation counter 144.

By way of example, the communication channel 108 is defined by a transmission frequency of 9 GHz, the communication channel 112 is defined by a transmission frequency of 10 GHz and the communication channel 146 is defined by a transmission frequency of 11 GHz, the transmission frequencies of the communication channels 112 and 146 differing from one another, since the PIN' which has been input into the chip card terminal 100 is not the same as the PIN. If the chip card 104 receives a signal on the frequency 10 GHz from the chip card terminal 100 in this case, even though it expected reception on the frequency 11 GHz, this signal is ignored and the incorrect operation counter is incremented. This provides an implicit check on the PIN' without the need for the PIN' to be compared directly with the PIN and without the PIN needing to be stored in the chip card.

Figure 2:
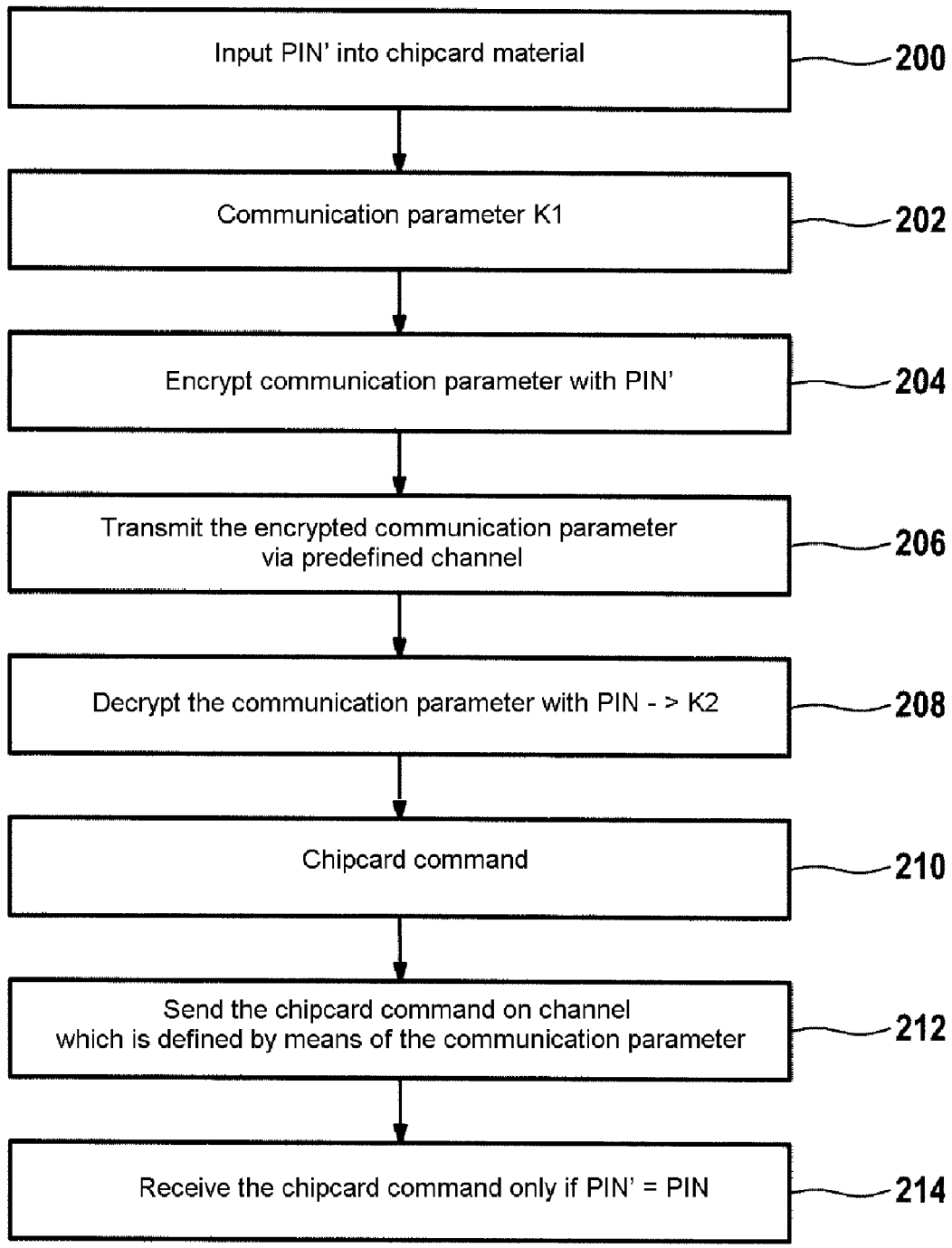
FIG. 2 shows a flowchart of an embodiment of a method based on the invention.

FIG. 2 shows an appropriate flowchart. In step 200, the PIN' is input in the chip card terminal. Next, in step 202, the chip card terminal 100 stipulates the communication parameter K1 for selecting one of the communication channels from the set of communication channels. In step 204, the communication parameter K1 is symmetrically encrypted using the PIN'. This can be done by virtue of a key generator being used to derive from the PIN' the symmetric key S1, which is then used to encrypt the communication parameter K1.

In step 206, the cipher produced for the communication parameter K1 using the key S1 is transmitted from the chip card terminal to the chip card via a predefined communication channel.

In step 208, the chip card 104 makes the attempt at decrypting the communication parameter K1 on the basis of the PIN. The correct PIN may be stored in a protected memory area of the chip card and is used to derive a symmetric key S2. Alternatively, the key S2 may also be stored in the protected memory area of the chip card directly.

The decryption of the cipher for the communication parameter K1 with the key S2 results in a communication parameter K2. Said communication parameter K2 may define a second communication channel in the set. Only if the PIN' is correct, i.e. if the condition PIN'=PIN is met, are the communication channels specified by the communication parameters K1 and K2 identical.

In step 210, the chip card terminal generates a chip card command and sends it to the chip card via the first communication channel, specified by the communication parameter K1 (step 212). In step 214, the chip card can receive the chip card command only if the second communication channel, for which the chip card is set up for reception, is identical to the first communication channel, i.e. if the condition PIN'=PIN is met. Conversely, the chip card ignores the cipher received on the first communication channel and increments the incorrect operation counter therefor.

In one embodiment of the invention, the communication parameter K1 may be a public key of the chip card terminal. The cipher for said public key, which cipher has been generated using the key S1 by means of symmetric encryption, is transmitted from the chip card terminal to the chip card. The chip card receives the correct public key of the chip card terminal only if in turn the condition PIN'=PIN is met, since only then is the decryption of the cipher using the key S2 successful (cf. the embodiment in FIG. 1). The public key of the chip card can be requested by the chip card terminal from an external keyserver, for example, via a network, particularly the Internet.

The chip card terminal can use the Diffie-Hellman method to derive a symmetric key S3 from the private key of the chip card terminal and the public key of the chip card. Accordingly, the chip card can likewise use the Diffie-Hellman method to derive a symmetric key S4 from the public key of the chip card terminal and its private key. The keys S3 and S4 are identical if the condition PIN'=PIN is met.

The first communication channel (cf. communication channel 112 in FIG. 1) is at least additionally defined by means of the symmetric keys S3=S4 in this embodiment. This is because the chip card command sent from the chip card terminal to the chip card is encrypted with the symmetric key S3, and can be decrypted, i.e. received, by the chip card only if the chip card command can be decrypted using the key S4. Otherwise, the chip card command is ignored and the incorrect operation counter is incremented.

Figure 3:
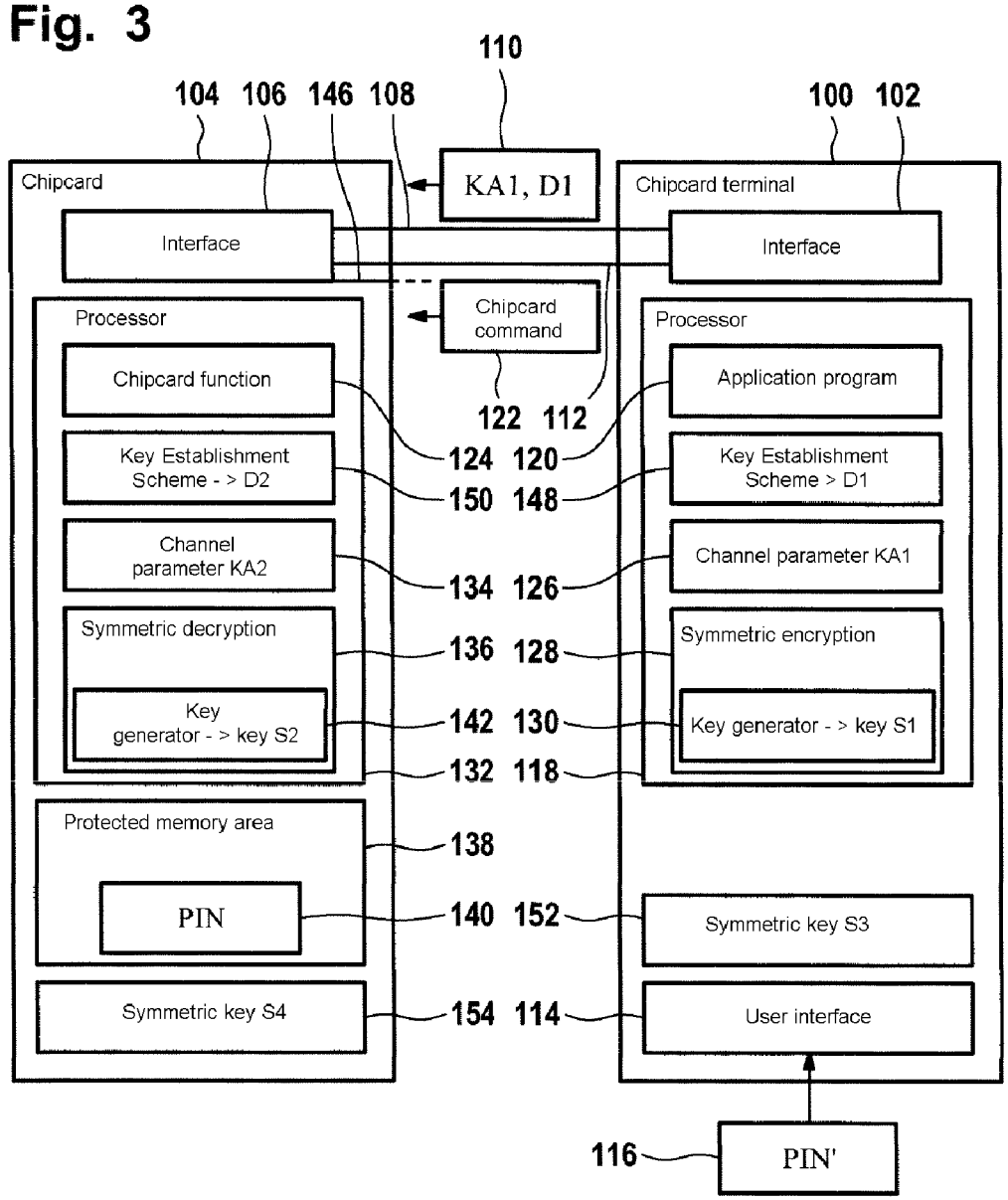
FIG. 3 shows a block diagram of a further embodiment of a chip card based on the invention and of a chip card terminal.

FIG. 3 shows an embodiment of a chip card based on the invention and of a chip card terminal based on the invention, wherein a method for discrete logarithmic cryptography is used to generate the keys S3 and S4. As an addition to the embodiment shown in FIG. 1, the processor 118 is used to execute program instructions 148, which provide what is known as a Key Establishment Scheme for generating the symmetric key S3.

The Key Establishment Scheme operates on the basis of a method for discrete logarithmic cryptography (DLC), particularly elliptic curve cryptography (EEC), preferably on the basis of an elliptic curve Diffie-Hellman method (ECDH). To generate the symmetric key S3, the program instructions 148 first of all produce first domain parameters, which are subsequently referred to as D1.

In addition, the communication module 126 can produce a first channel parameter KA1 or can read it from a prescribed list, such a first channel parameter specifying the physical properties of the first communication channel, for example.

The first channel parameter KA1 corresponds to the channel parameter K1 in the embodiment in FIG. 1.

The domain parameters D1 and the channel parameter(s) KA1 are encrypted by the program instructions 128 using the key S1. The cipher 110 obtained from KA1, D1 using the key S1 is transmitted from the interface 102 to the interface 106 via the predefined communication channel 108.

The chip card 104 decrypts the cipher 110 using the symmetric key S2. As a result of the decryption, the chip card 104 obtains the second channel parameter KA2, which corresponds to the communication parameter K2 in the embodiment in FIG. 1. In addition, the chip card obtains the domain parameters D2. The channel parameter KA2 is processed by the communication module 134 in order to establish the physical specification of the second communication channel 146, for example.

As an addition to the embodiment in FIG. 1, the chip card 104 has program instructions 150, the functionality of which corresponds to that of the program instructions 148 and which implement the Key Establishment Scheme on the chip card.

The chip card terminal executes the program instructions 148 in order to derive the symmetric key S3, which is stored in a memory 152 of the chip card terminal 100, from the domain parameters D1. Accordingly, execution of the program instructions 150 by the chip card 104 derives a symmetric key S4, which is stored in a memory 154 of the chip card 104, from the domain parameters D2.

The chip card command 122 is encrypted by the chip card terminal with the symmetric key S3 before being sent and is then transmitted via the first communication channel 112 specified by the channel parameters KA1. The chip card command 122 can be received by the chip card 104 only if both KA2=KA1 and D2=D1, which in turn is possible only if the condition PIN'=PIN is met.

Of particular advantage in this embodiment is the fact that the transmission of the domain parameters D1 via the predefined communication channel 108 cannot be spied out by third parties, since the domain parameters D1 are transmitted in an encrypted form.

Figure 4:
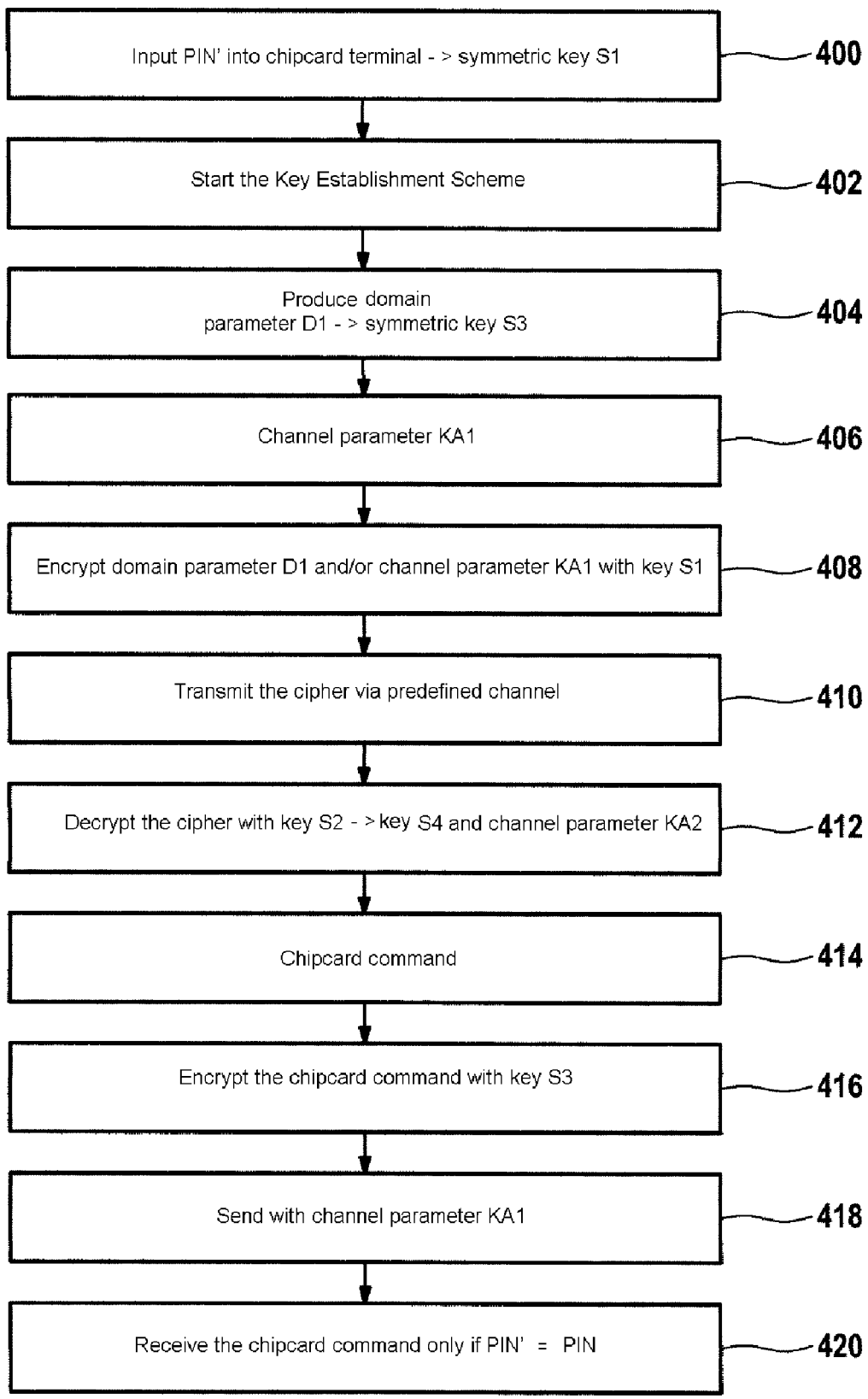
FIG. 4 shows a flowchart of a further embodiment of a method based on the invention.

FIG. 4 shows an appropriate flowchart. In step 400, a PIN' is input into the chip card terminal by a user. The symmetric key Si is derived from the PIN'.

In step 402, the Key Establishment Scheme is started. Next, in step 404, a set of domain parameters D1 is produced. The domain parameters D1 are used for the generation of the symmetric key S3 by the chip card terminal. In addition, in step 406, the chip card terminal generates the channel parameter KA1 or reads it from a prescribed list.

In step 408, the domain parameters D1 and/or the channel parameters KA1 are encrypted with the key S1. By way of example, the domain parameters D1 and the channel parameters KA1 are appended to one another, which results in a single communication parameter which is then encrypted with the key S1. Alternatively, only the domain parameters D1 or only the channel parameters KA1 or a respective subset of the domain and/or channel parameters are encrypted with the key S1. The cipher resulting from the encryption with the key S1 and any remaining unencrypted domain and/or channel parameters are transmitted from the chip card terminal to the chip card via the predefined channel (cf. communication channel 108 in FIGS. 1 and 3) in step 410.

In step 412, the chip card attempts to decrypt the cipher using the key S2. From this, the chip card 104 obtains the channel parameters KA2 and the domain parameters D2. The chip card 104 derives the key S4 from the domain parameters D2.

In step 414, the chip card terminal 100 generates a chip card command, which is encrypted with the key S3 (step 416) in order to transmit it via the first communication channel defined by the channel parameters KA1 (cf. communication channel 112 in the embodiments in FIGS. 1 and 3). The chip card terminal 100 sends the chip card command in step 418.

Correct reception of the cipher by the chip card is possible in step 420 only if the second communication channel 146 matches the first communication channel 112, i.e. if KA2=KA1, and if, furthermore, the chip card command can be decrypted with the key S4, i.e. if S4=S3. However, the conditions KA2=KA1 and S4=S3 can be met only if the correct PIN' has been input into the chip card terminal by the user, i.e. if PIN'=PIN.

List of Reference Symbols
100 Chip card terminal
102 Interface
104 Chip card
106 Interface
108 Predefined communication channel
110 Communication parameter
112 First communication channel
114 User interface
116 PIN'
118 Processor
120 Application program
122 Chip card command
124 Chip card function
126 Communication module
128 Program instructions
130 Key generator
132 Processor
134 Communication module
136 Program instructions
138 Protected memory area
140 PIN
142 Key generator
144 Incorrect operation counter
146 Second communication channel
148 Program instructions
150 Program instructions
152 Memory
154 Memory

The invention claimed is:

1. A method for protecting a chip card from unauthorized use, comprising the following steps:
a first identifier is input into a chip card terminal,
a cipher is produced from at least one first communication parameter using a first symmetric key derived from the first identifier, wherein the communication parameter can be used to define a protected first communication channel between the chip card terminal and the chip card,
the cipher is transmitted via a predefined communication channel from the chip card terminal to the chip card,
an attempt is made to decrypt the cipher using a second symmetric key by the chip card, the result of the decryption being the first communication parameter only if the first symmetric key is the same as the second symmetric key, so that the protected first communication channel can be defined between the chip card terminal and the chip card only if the first identifier is correct,
wherein the first communication parameter is the specification of a transmission frequency, of a frequency hopping scheme, of a coding method and/or of a modulation method, and
wherein the first communication parameter is a first domain parameter for the performance of a discrete logarithmic cryptographic method for the production of a third symmetric key by the chip card terminal of a fourth symmetric key by the chip card and, wherein the third and fourth keys are identical if the first identifier is correct, wherein the third and fourth symmetric keys are provided for the purpose of encrypting the communication between the chip card terminal and the chip card via the protected first communication channel.

2. The method as claimed in claim 1, wherein the first communication parameter is a public key of the chip card terminal, wherein the chip card, if the decryption of the cipher is successful, takes the public key and uses the Diffie-Hellman (DH) method to derive a further symmetric key for encrypting the communication between the chip card terminal and the chip card, wherein the encryption with the further symmetric key defines the first communication channel.

3. The method as claimed in claim 1, wherein the discrete logarithmic cryptographic method is an elliptic curve cryptographic method.

4. The method as claimed in claim 1, wherein the discrete logarithmic cryptographic method is an elliptic curve Diffie-Hellman method.

5. The method as claimed in claim 1, wherein the first identifier is used as a seed value for the derivation of the first symmetric key by the chip card terminal.

6. The method as claimed in claim 1, wherein the result of the decryption is an incorrect second communication parameter if the first identifier is incorrect, wherein the second communication parameter allows an incorrect second communication channel to be defined by the chip card, the method further comprising the following steps:
a chip card command is sent from the chip card terminal to the chip card on the protected first communication channel,
the chip card command is ignored by the chip card and the number of remaining incorrect operations is reduced, wherein the chip card or a chip card function of the chip card is locked if a prescribed number of incorrect operations is exceeded.

7. A chip card, comprising:
an interface for communication with a chip card terminal via a predefined communication channel and a plurality of further communication channels,
means for the decryption of a cipher received on the predefined channel, which cipher has been encrypted using a first symmetric key, using a second symmetric key, wherein the decryption yields at least one communication parameter if a first identifier which has been input into the chip card terminal previously is correct, wherein the communication parameter explicitly stipulates one of the further communication channels for the protected communication between the chip card and the chip card terminal,
wherein the first communication parameter is the specification of a transmission frequency, of a frequency hopping scheme, of a coding method and/or of a modulation method, and
wherein the first communication parameter is a first domain parameter for the performance of a discrete logarithmic cryptographic method for the production of a third symmetric key by the chip card terminal of a fourth symmetric key by the chip card and, wherein the third and fourth keys are identical if the first identifier is correct, wherein the third and fourth symmetric keys are provided for the purpose of encrypting the communication between the chip card terminal and the chip card via the protected one of the further communication channels.

8. The chip card as claimed in claim 7, wherein the first communication parameter specifies a public key, and having means for performing a Diffie-Hellman method for the derivation of a further symmetric key using the public key.

9. The chip card as claimed in claim 7, further comprising:
means for performing a discrete logarithmic encryption method for the production of the further symmetric key, wherein the further symmetric key is provided for the symmetric encryption of the communication between the chip card terminal and the chip card via the stipulated communication channel,
a nonvolatile protected memory area for storing a second identifier from which the second key can be derived, and
a protected nonvolatile memory area for storing the second key.

10. The chip card as claimed in claim 7, further comprising:
an incorrect operation count for locking the chip card if the number of incorrect operations has reached a prescribed threshold value, wherein:
a message received by the chip card which is sent to the chip card on one of the further communication channels which is not the stipulated communication channel is counted as an incorrect operation, and
the chip card is at least one of: a document, a value or security document, an ID card, a means of payment, and a signature card.

11. The chip card as claimed in claim 7, further comprising:
a first-user function, wherein:
in a first-use state, a particular communication parameter is stipulated for a first selection of the first communication channel, and
the chip card changes from its first-use state to a used state when it receives a chip card command on said first communication channel for the first time.

12. A chip card terminal, comprising:
means for the input of a first identifier,
means for the production of a cipher from at least one first communication parameter using a first symmetric key derived from the first identifier, wherein the communication parameter can be used to define a protected first communication channel between the chip card terminal and the chip card,
means for sending the cipher to the chip card via a predefined communication channel,
wherein the first communication parameter is the specification of a transmission frequency, of a frequency hopping scheme, of a coding method and/or of a modulation method, and
wherein the first communication parameter is a first domain parameter for the performance of a discrete logarithmic cryptographic method for the production of a second symmetric key by the chip card terminal of a third symmetric key by the chip card and, wherein the second and third keys are identical if the first identifier is correct, wherein the second and third symmetric keys are provided for the purpose of encrypting the communication between the chip card terminal and the chip card via the protected first communication channel.

13. The chip card terminal as claimed in claim 12, further comprises means for producing domain parameters for the performance of a discrete logarithm cryptographic method for the derivation of a further symmetric key for encrypting the communication between the chip card terminal and the chip card, wherein the first communication parameter specifies the domain parameter.

* * * * *